J. STEINBERG.
COFFEE STEEPER.
APPLICATION FILED DEC. 23, 1907.
900,128.
Patented Oct. 6, 1908.
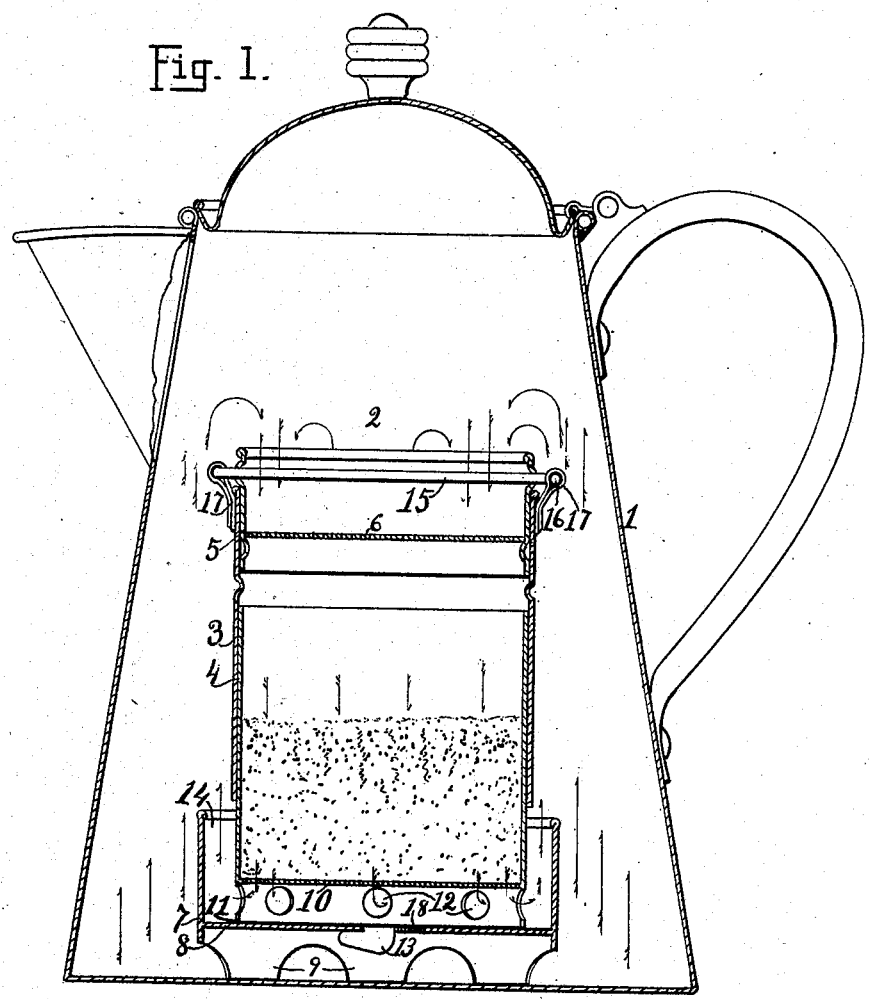
Fig. 1.
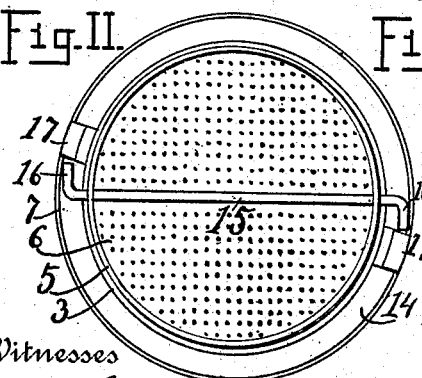
Fig. II.
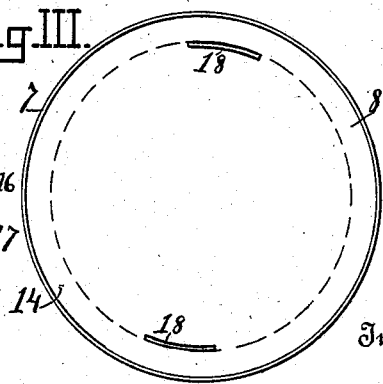
Fig. III.
Witnesses
N. S. Waller.
E. Gray.
Inventor
Jacob Steinberg
by W. R. Stevens
Attorney
THE NORRIS PETERS CO., WASHINGTON, D. C.

UNITED STATES PATENT OFFICE.

JACOB STEINBERG, OF PITTSBURG, PENNSYLVANIA.

COFFEE-STEEPER.

No. 900,128.  Specification of Letters Patent.  Patented Oct. 6, 1908.

Application filed December 23, 1907. Serial No. 407,810.

*To all whom it may concern:*

Be it known that I, JACOB STEINBERG, a citizen of the United States, residing at Pittsburg, in the county of Allegheny and State of Pennsylvania, have invented new and useful Improvements in Coffee-Steepers, of which the following is a specification.

This invention relates to coffee steepers and its object is to circulate hot water rapidly through and through the coffee and yet not heat the coffee so hot as to embitter the beverage, nor permit the fine particles to roil the beverage by remaining in it.

To this end my invention consists in the construction and combination of parts forming a coffee steeper hereinafter more fully described and particularly set forth in the claims, reference being had to the accompanying drawings in which, Figure 1 represents in vertical section, a coffeepot and my steeper within it. Fig. 2 shows a top view of the steeper and Fig. 3 shows a top view of the bottom shield and gallery.
This coffee steeper can be used for steeping tea, herbs etc., but to avoid prolixity I describe it under the common title as above given.

Numeral 1 represents a coffeepot and 2 my steeper which comprises a body in two parts 3 and 4, one of which telescopes upon the other; a cup 5, which fits snugly yet removably into the body portion 3, and is provided with a perforated bottom 6, which is the top of the coffee holder; and a bottom shield 7, having an imperforate bottom 8, and legs 9. The bottom 10, of the coffee holder is perforated and located a little above the lower end 11, of the body and has openings 12, through its sides below the said bottom 10. The body 4, has also depending hooks 13, to pass through slots 18, in the bottom 8, and turn under to engage the shield 7, and hold it removably attached to the body. The shield is larger in diameter than the body 4, forming a gallery 14, around it. A stiff wire 15, crosses entirely through the cup 5, and has oppositely bent ends 16, to engage ears 17, on the body 3, by revolving the cup a little.
This wire serves as a handle to be engaged by any suitable lifter for removing the steeper from the boiler when hot.

The operation is as follows. Open the coffee holder by separating the portions 3 and 4, or by taking out the cup 5; put in a charge of coffee and replace the parts. Set the steeper on end into the coffeepot or boiler, taking pains to shut together the telescoping portions 3, 4, until the steeper will stand fully immersed in the desired amount of water. Then when heat from the bottom of the boiler enters the water expansion causes that water to rise to the top and flow over into the cup 5. The bottom 8, of the shield protects the coffee holder bottom 10, from contact with the hottest water so that the interior of the steeper is heated only by the downward return current passing through it and it cannot be made boiling hot under usual conditions of service. The water passes down through the charge of coffee, through the bottom 10, out through openings 12, and up through the gallery 14, where the surrounding upward current of heated water mingles with it and carries it over into the top of the steeper again. This continuous circulation of hot water through and through the coffee soon extracts all of its virtue, yet it does not heat the coffee to such a degree as to embitter the beverage. The shield bottom 8, being located above the bottom of the boiler permits free contact of the water with the whole surface of the boiler bottom, thus utilizing all the heat thereof, and it directs the heated water to pass out at its sides to increase the surrounding upward current. This steeper may be used in any kind of coffeepot, urn, or boiler suitable for such purposes. It may be used for steeping common tea, herb tea, or any similar extract.

The bottoms 6 and 10 may be perforated sheet metal, or wire cloth or any suitable straining material. This steeper may be made and sold as a detachable portion of coffeepots, urns, boilers etc., or it may be put on the market as an article of manufacture adapted for use with boilers of any kind already in use.

Having thus fully described my invention, what I believe to be new and desire to secure by Letters Patent is the following:

1. In coffee steepers, a coffeepot or boiler and a coffee holder to be placed within it; the said holder comprising two portions fitted to telescope together; a cup fitting into the upper portion and having a perforated bottom; a perforated bottom in the lower portion located above the lower edge thereof; openings through the sides of the lower portion below the said bottom thereof; a shield greater in diameter than the body and forming a gallery around it and removably secured to it; this shield having an imperforate bottom and provided with legs to stand on the bottom of the coffeepot.

2. In coffee steepers, a coffee holder adapted to be placed in a boiler and having a perforated bottom located above its lower edge and openings through the sides below the said bottom; a cup located in the said holder and having a perforated bottom which is the top of the holder; a shield located below and around the holder at some distance from the sides thereof, forming a gallery around it and removably attached to it; the shield having legs adapted to hold it raised from contact with the boiler.

3. In coffee steepers, a coffee holder having a perforated bottom located above its lower edge and openings through the sides below the bottom, and a removable perforated top; and a shield having legs and an imperforate bottom attached to the lower end of the coffee holder and forming an open gallery around it, substantially as shown and described.

In testimony whereof I affix my signature, in presence of two subscribing witnesses.

JACOB STEINBERG.

Witnesses:
E. E. FULMER,
CHARLES B. ANDRES.